United States Patent [19]

Pearson

[11] Patent Number: 4,610,786
[45] Date of Patent: Sep. 9, 1986

[54] FILTER CAGE WITH REMOVABLE FILTERS

[75] Inventor: James A. Pearson, Northumberland, Great Britain

[73] Assignee: Swinney Engineering Limited, Morpeth, England

[21] Appl. No.: 594,225

[22] Filed: Mar. 28, 1984

[30] Foreign Application Priority Data

Mar. 29, 1983 [GB] United Kingdom ............... 8308588

[51] Int. Cl.$^4$ ....................... B01D 25/02; B01D 25/08
[52] U.S. Cl. ..................... 210/236; 210/232; 210/323.2; 210/333.1; 210/412
[58] Field of Search ............ 210/232, 236, 238, 323.2, 210/333.01, 333.1, 345, 347, 411, 412

[56] References Cited

U.S. PATENT DOCUMENTS

| | | | |
|---|---|---|---|
| 2,562,699 | 7/1951 | Cooperson | 210/333.01 |
| 2,709,525 | 5/1955 | Beyer | 210/232 |
| 2,718,310 | 9/1955 | Trahan | 210/232 |
| 2,742,157 | 4/1956 | Brunton | 210/333.1 |
| 3,225,933 | 12/1965 | Berline | 210/333.01 |
| 3,477,577 | 11/1969 | Florkowski | 210/333.1 |
| 4,446,099 | 5/1984 | Schwind | 210/232 |

FOREIGN PATENT DOCUMENTS

| | | | |
|---|---|---|---|
| 1091933 | 11/1967 | United Kingdom | 210/232 |
| 2067087 | 7/1981 | United Kingdom | 210/232 |

Primary Examiner—Ernest G. Therkorn
Attorney, Agent, or Firm—Brown, Martin & Haller

[57] ABSTRACT

A filter has a plurality of cylindrical filter elements (5) supported exteriorly over holes (4) in a hollow filter cage (3). A backwash pipe (11) is disposed axially of the filter cage (3) and has ducts (12) which are arranged, on rotation of the backwash pipe, to register with the holes (4) in the filter cage (3) to allow backwashing of the filter elements. The filter cage (3) has retaining portions (7) in the form of a T-slot or spaced abutments. The filter elements (5) each have a circumferential flange (8) provided with at least one flat (9) so that, in a first angular orientation of a filter element (5) the filter element is held firmly by engagement of the flange (8) under the retaining portions (7) and, in a second angular orientation, it is free for removal.

12 Claims, 18 Drawing Figures

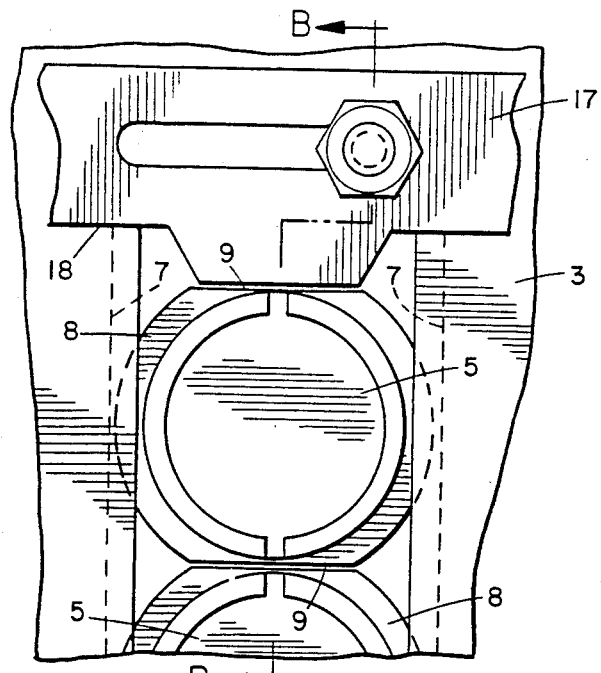
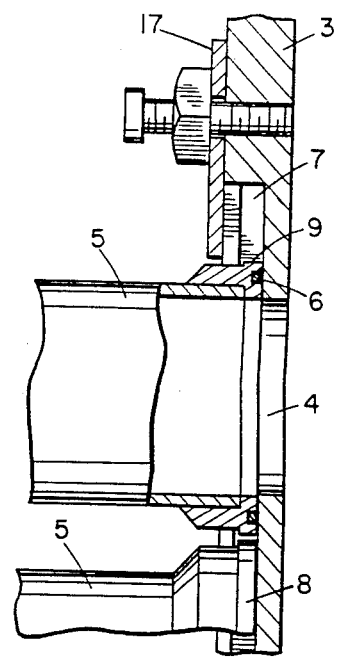
Fig. 2a
Fig. 2b
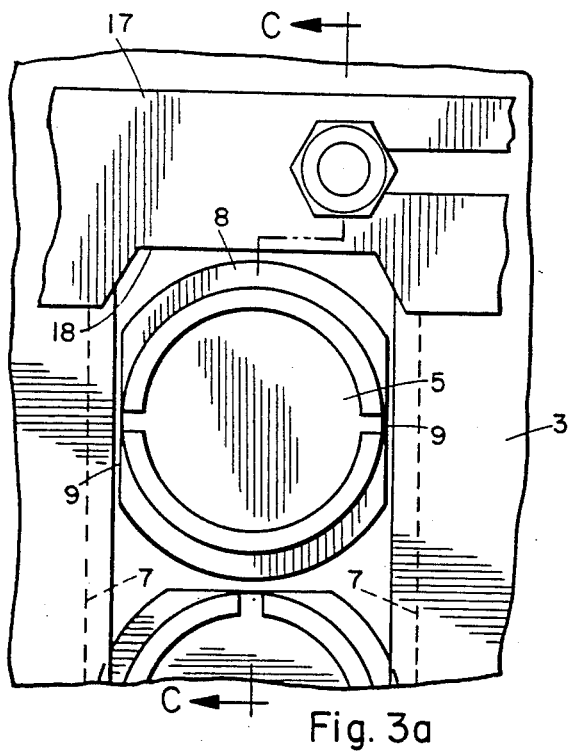
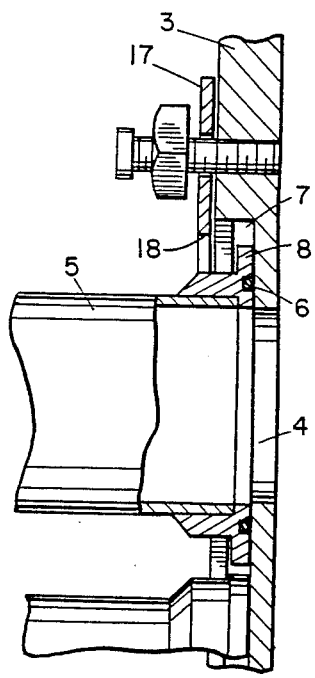
Fig. 3a
Fig. 3b

FILTER CAGE WITH REMOVABLE FILTERS

FIELD OF THE INVENTION

This invention relates to an improved filter.

DESCRIPTION OF THE PREFERRED EMBODIMENTS

In our prior U.K. Pat. No. 2067087 there is disclosed a filter having a plurality of cylindrical filter elements supported over respective holes in a stationary hollow supporting filter cage. The holes are arranged in axial rows and each row of filter elements is held in position by a releasable clamping bar or bars. In order to clean the filter elements a rotatable backwash pipe is disposed axially and nozzles in the pipe are arranged to register with each hole in succession to backwash the filter elements.

Whilst this arrangement overcame the problem of retaining filter elements without screwing Cor bolting the elements in position, we have now designed an improved filter which provides an improved method of fitting the filter elements in position.

SUMMARY OF THE INVENTION

According to the present invention there is provided a filter comprising a plurality of filter elements covering respective holes in a filter cage, and retaining means for holding the elements in position against lateral displacement, the filter elements, in a first position being retained by the retaining means against their respective holes in the filter cage and, in a second position being releasable by simple manipulation.

Preferably the retaining means comprises one or more T-shaped slots in the filter cage, each filter element having a flange with two opposed flats which permit the filter element to be fitted and locked, or alternatively released, simply by turning the filter element angularly through 90°. Alternatively, the retaining means may be enlarged headed pins on the filter cage.

More particularly a filter comprises a plurality of filter elements supported exteriorly over holes in a hollow filter cage, a backwash pipe disposed axially of the filter cage, ducts in the backwash pipe arranged to register with the holes in the filter cage, means for effecting relative rotation between the backwash pipe and the filter cage so that the ducts are brought into registration in turn with the holes to permit backwashing of the filter elements, and slot means for positioning the filter elements over their respective holes, the filter elements each having a flange which, in a first angular orientation of the element retains the filter element firmly within the slot means and, in a second angular orientation thereof, permits removal of the filter element by simple manipulation. If desired the filter elements may be locked against angular movement by releasable locking means.

BRIEF DESCRIPTION OF THE DRAWINGS

The invention will now be described by way of example with reference to the accompanying drawings in which:

FIG. 2a is an enlarged side elevation showing a filter element in one arrangement in locked position;

FIG. 2b is a sectional view taken on line B—B of FIG. 2a;

FIG. 3a is an enlarged side elevation showing the arrangement of FIG. 2a in the unlocked position;

FIG. 3b is a sectional view taken on line C—C of FIG. 3a;

FIG. 4b is a sectional view taken on line D—D of FIG. 4a;

FIG. 5b is a sectional view taken on line E—E of FIG. 5a;

FIG. 6b is a sectional view taken on line F—F of FIG. 6a;

FIG. 7b is a sectional view taken on line G—G of FIG. 7a;

FIG. 8b is a sectional view taken on line H—H of FIG. 8a;

DESCRIPTION OF THE PREFERRED EMBODIMENTS

Figure 1:
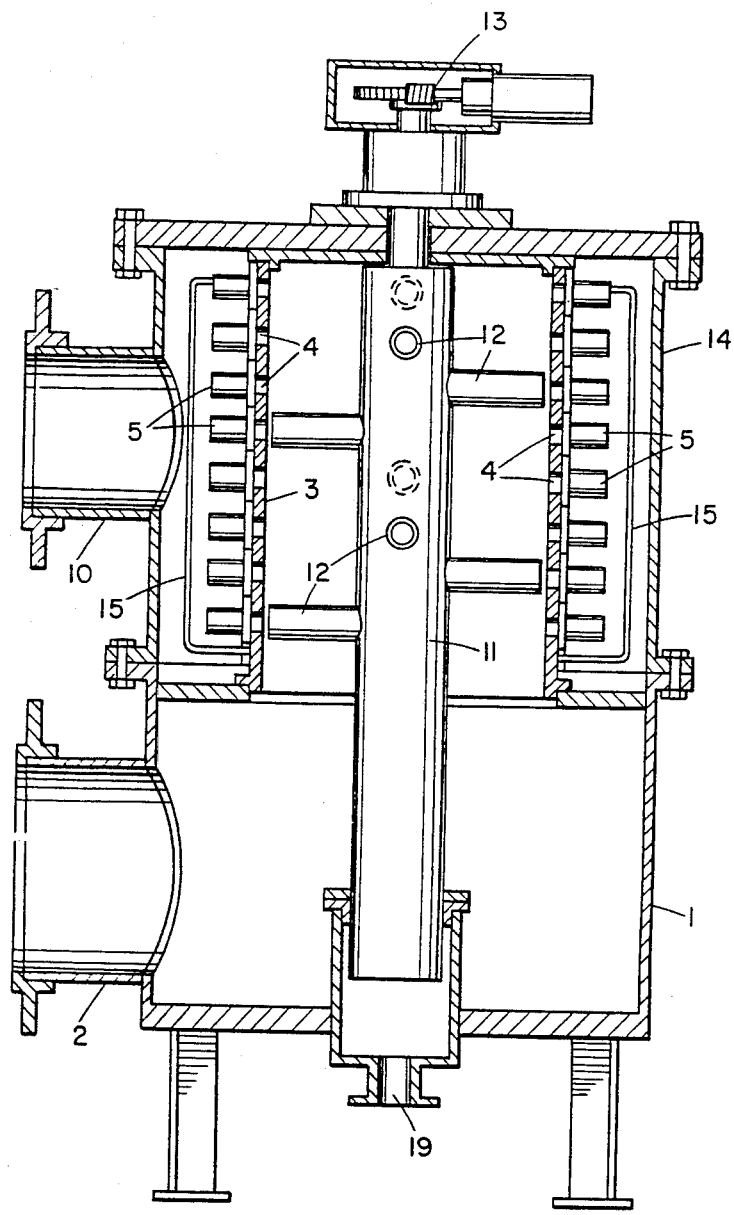
FIG. 1 is a side elevation of a filter in accordance with the invention with portions in section.

In FIG. 1 a filter body 1 has an inlet pipe 2 through which liquid to be filtered normally flows. The inlet pipe communicates with the interior of a filter cage 3 which has a plurality of holes 4 formed therein and arranged in vertical rows. The holes 4 define flow spaces for the liquid to be filtered and disposed over each hole 4 is a filter element 5 of cylindrical or other shape. The filter media is suitably a wire mesh filter media, but may be any other suitable media such as a perforated sheet, gauze, or sintered material or may be a unit including loose filtering media such as sand or activated carbon.

The filter elements 5 are located on the holes 4, suitably, where fine filtration is involved with an 'O' ring seal 6 sealing about the mouth of the respective opening (see FIG. 2b).

In order to hold the filter elements 5 in position, in one arrangement, retaining means in the form of slots 7 are machined into the filter cage 3 and each filter element 5 is formed with an annular flange 8 which engages in a respective slot 7. The filter element flange 8 has two opposed flats 9 which permit the filter element 5 to be fitted and locked, or alternatively released, by simply turning the filter element 5 angularly through 90° so that, when the flats 9 are aligned with the slot 7, the filter element 5 may be lifted out or inserted (see FIGS. 9a, 9b).

A liquid to be filtered flows into the filter by way of the pipe 2, as indicated by the arrow, passes through the filter element 5, and is discharged through an outlet pipe 10. Disposed axially of the filter cage is a backwash pipe 11 having eight backwash ducts 12 which align to turn with each of the holes 4 when the backwash pipe 11 is caused to rotate by means of a drive unit 13.

It will be understood that the arrangement shown in FIG. 1 is an example only and the unit may be arranged differently. Thus the drive unit 13 may be underneath rather than on top and the inlet and outlet pipes 2 and 10 positioned on opposite sides, or the cover may be raised and rotated as disclosed in our prior U.K. Pat. No. 2067087 to which reference is directed for a fuller disclosure of this aspect.

The retaining means for retaining the filter elements 5 can be a machined slot 7 as disclosed above or may take an alternative form as shown in one of FIGS. 5a to 9, FIGS. 5a, 7a, and 9 of which show the filter elements 5 in both a locked and an unlocked position.

Figure 5A:
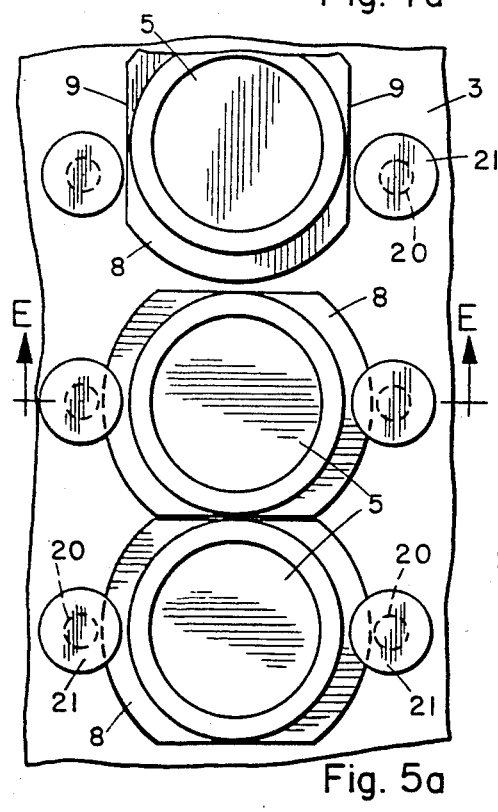
FIG. 5a is a side elevation view of an alternative retaining means.
Figure 5B:
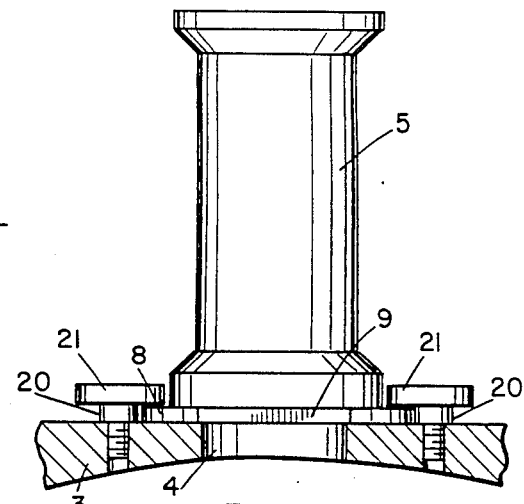

Thus, in the arrangement of FIGS. 5a, and 5b the filter elements 5 are releasably locked under opposed pairs of abutments in the form of pins 20 secured to the filter cage 3 and each having an enlarged head 21 under which the flanges 8 of the filter elements 5 may engage.

Figure 6A:
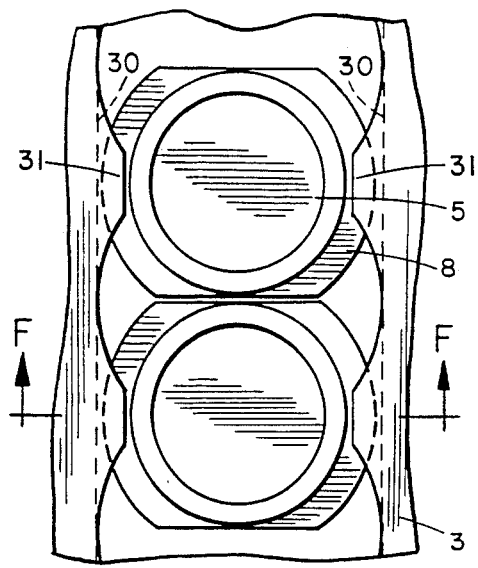
FIG. 6a is a side elevation view of a further alternative retaining means.
Figure 6B:
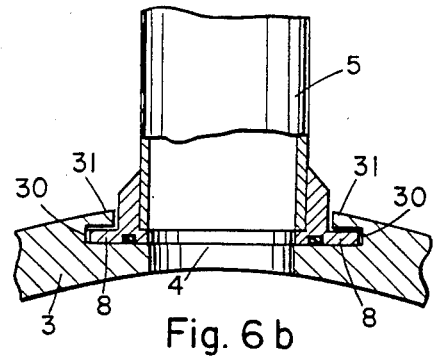
Figure 7A:
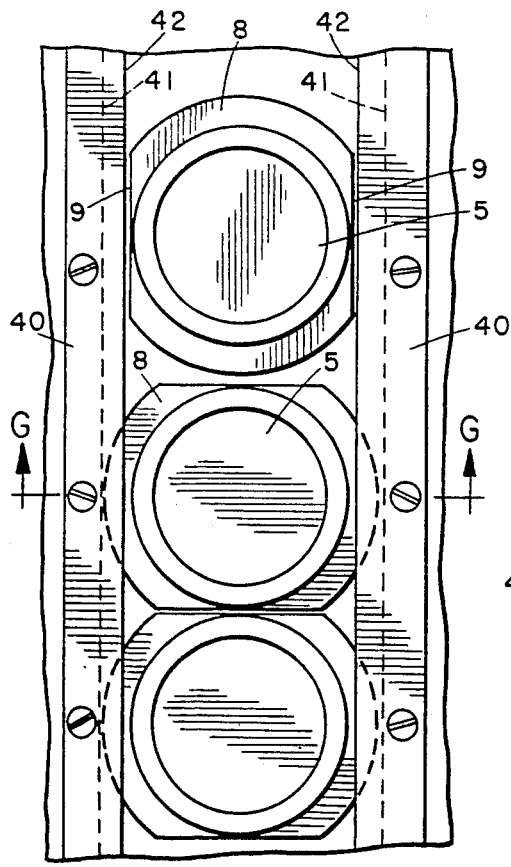
FIG. 7a is a side elevation view of another alternative retaining means.
Figure 7B:
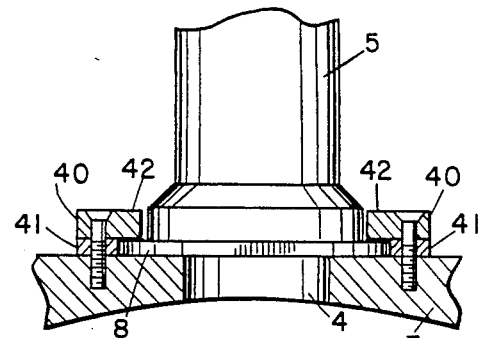
Figure 8A:
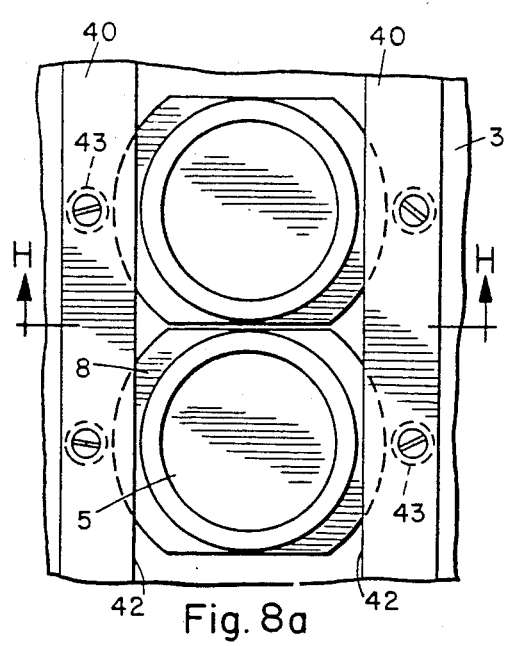
FIG. 8a is a side elevation view of yet another alternative retaining means.
Figure 8B:
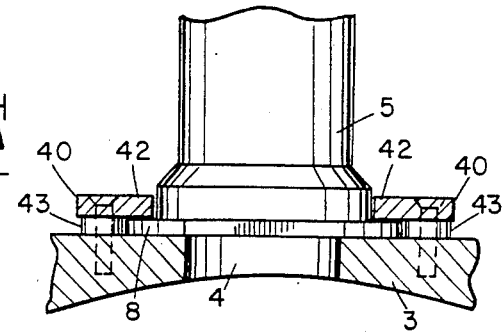

In FIGS. 6a and 6b, the filter elements 5 are releasably locked in machined slots 30 with locking lips or abutments 31 only at the filter element positions. The arrangement of FIGS. 7a and 7b illustrates a method of releasably securing the filter elements 5 under strips 40 bolted to the filter cage 3 and spaced therefrom by narrow strips 41 so as to provide locking lips 42. The arrangement of Figures 8a and 8b the arrangement is similar to that shown in FIGS. 7a and 7b except that the spacing of the strips 40 from the filter cage 3 is achieved by means of spacing washers 43.

Figure 9:
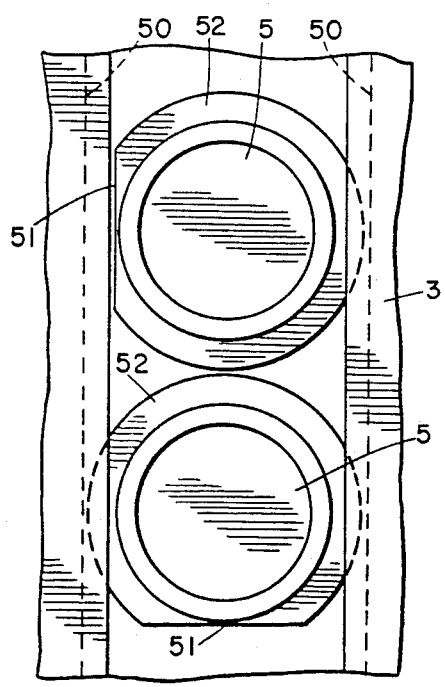
FIG. 9 is a side elevation view of a further alternative embodiment.
Figure 10A:
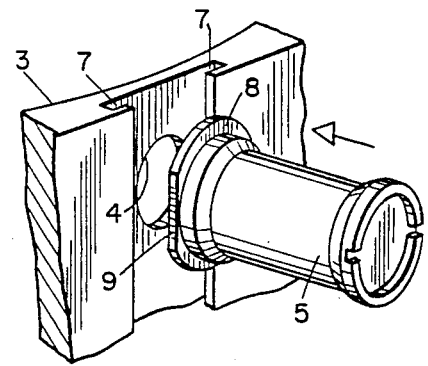
FIG. 10a and 10b are perspective views showing insertion and locking of a filter element where the retaining means is a continuous machine slot.
Figure 10B:
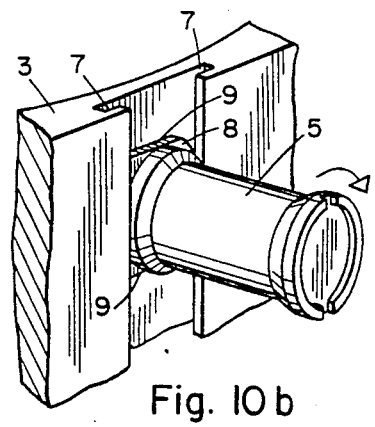

In FIG. 9 the retaining means is machined slots 50 but the filter elements 5 are provided with only one flat 51, the opposed flange portion 52 being located or freed by inclination of the filter element 5 out of radial orientation with respect to the filter cage.

When it is necessary to clean or replace a filter element 5 the top cover 14 or a lid (not shown) is released and lifted. In order to protect the filter element 5 against damage during lifting fixed guide bars 15 are provided which extend axially of the filter cage 3 and are positioned between the vertical rows of holes 4. When the covers 14 or lid, has been removed the filter elements 5 to be removed are simply manipulated through 90° to align the flats 9 or flat 51 with the retaining means and then pulled away.

Alternatively, where the retaining means are spaced abutments, it may be possible to slide the filter elements vertically to allow release between abutments without angular movement.

Figure 4A:
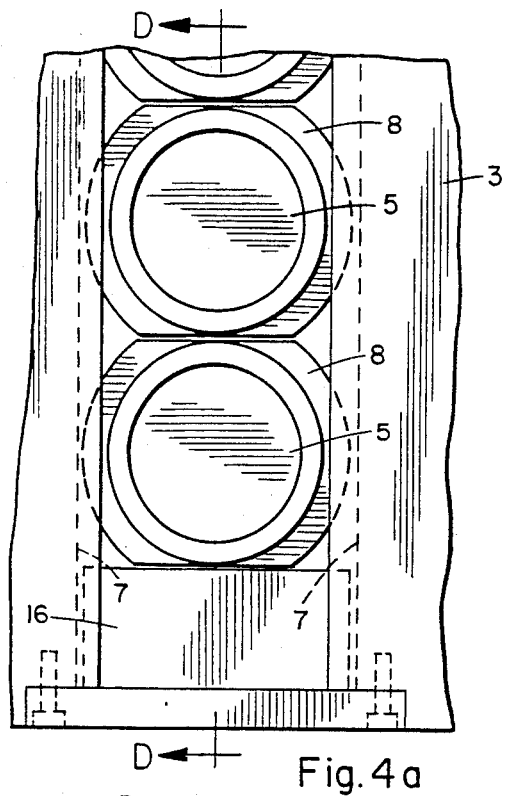
FIG. 4a is an enlarged side elevation showing an alternative locking arrangement.
Figure 4B:
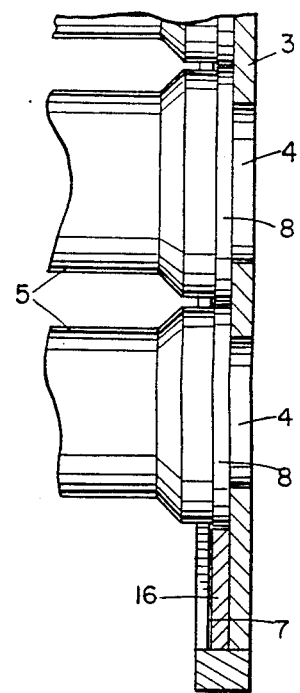

In some cases a plate 16, such as that shown at the lower edge of the filter cage 3 in FIGS. 4a, 4b, may be provided to lock in a stack of filter elements 5. Alternatively, as shown in FIGS. 2a, 2b, 3a, 3b a ring 17 with milled recesses 18 may be provided which, upon rotation of the ring 17, brings a recess 18 opposite to a stack of filter elements 5 giving enough freedom for each one to be rotated and released.

In use the self-cleaning backwashing filter is arranged to allow flow to continue whilst the cleaning operation is in progress. Contaminated liquid is introduced to within the filter cage 3 through the inlet 2 and passes to the outlet 10 through the filter elements 5. Cleaning is accomplished by rotation of the backwash pipe 11 and its radial ducts 12 which align briefly with each filter element 5 in turn. The action of the ducts traversing the filter elements induces a reversal of flow of clean liquid back through the filter elements 5 causing any dirt to be washed off and conveyed to a backwash discharge 19, The backwashing may be continuous or intermittent and may be controlled electronically by the pressure differential across the filter cage 3.

When it is desired to remove one or more filter elements 5 for replacement, the locking plate 16 or ring 17, if provided, is released or moved to a releasing position, and then the filter elements are simply removed from registration with holes 4 by angular manipulation through 90°. In practice, in order to release a filter element 5 it is only necessary for it to lift axially about 5 mm to allow the flats 9 or flat 51 to be vertically aligned so that the filter element can be taken out for cleaning or renewal. In this way the filter elements 5 need not be slid the length of the filter cage 3 over the holes 4 which could damage the O-ring seals 6. Moreover, as there is no screw interengagement between the filter elements 5 and the filter cage 3 removal is made easier.

Although the filter elements are preferably cylindrical in shape they may be of any other suitable shape.

As can be seen from FIG. 1 the stacks of filter elements 5 may be retained by the top cover of the filter or by a plate attached to it as an alternative to the proposals in FIGS. 2a, 2b, 3a, 3b. In some cases the element cage 3 may be attached to the filter top flange and lifted with it so the filter elements are released and can be moved downwardly to permit release. These alternative methods all provide the necessary clearance to enable the filter elements 5 to be rotated and released as described above.

I claim:

1. A filter comprising:
   a filter cage having a row of holes therein;
   a filter element mounted over each hole, said filter cage having opposed retaining means on opposite sides of the row of holes for securing each filter element, and each filter element having projecting flange means for engagement under the opposed retaining means in a first locked position for securing said filter element over the respective hole, each flange means having at least one cut away flat portion, with the flat portion of one filter element abutting the flat portion of a second adjacent filter element in said first, locked position for preventing angular movement of said filter members; and
   releasable locking means for locking the filter elements in the row against lateral movement, said locking means being releasable to allow relative angular and lateral movement of said filter elements into a second, unlocked position so that said flat portions of said filter elements can be aligned in the direction of the row to clear the retaining means to allow removal of the filter element from the filter cage.

2. A filter according to claim 1, wherein said retaining means comprises flange receiving slots recessed in said filter cage.

3. A filter according to claim 1, wherein said retaining means comprise pins secured to said filter cage on opposite sides of each hole, each pin having an enlarged flange engaging head.

4. A filter according to claim 1, wherein said holes are aligned in rows, said retaining means including strips secured to said filter cage along opposite sides of each row and being spaced from the filter cage to define flange engaging lips.

5. A filter according to claim 1, wherein said locking means comprises means on at least one end of the row of slots for securing a row of filter elements therein.

6. A filter according to claim 1, wherein said filter cage is substantially cylindrical, and including a backwash pipe mounted axially in the cage, said backwash pipe having a plurality of ducts extending radially therefrom, in alignment with certain of said holes;

and means for rotating said backwash pipe, whereby said ducts register progressively with the holes to conduct backwash flow through the filter elements.

7. A filter according to claim 1, wherein said filter cage has a plurality of rows of holes and a plurality of rows of filter elements releasably supported exteriorly of said filter cage over said rows of holes.

8. A filter according to claim 1, wherein the flange means of each filter element has two opposed cut away flat portions.

9. A filter according to claim 1, wherein said releasable locking means comprises a locking member having a recess, and which is movable into a position in which said recess is aligned with said row to allow lateral movement of said filter elements.

10. A filter according to claim 1, wherein said filter cage has a T-shaped slot extending along the length of said row of holes, said holes being provided in the base of said slot and said retaining means comprising the opposed outer lips of said slot.

11. A filter according to claim 1, wherein said retaining means comprises pairs of strips bolted to said filter cage on each side of said row, the strip of each pair which is adjacent the filter cage being narrower so that the outer strip of each pair comprises a retaining lip for projecting over said flange means.

12. A filter according to claim 1, wherein each filter element comprises a hollow body including filter media, an outlet from the hollow body being positioned over a respective hole in said filter cage, said flange means comprising a projecting flange on an outer portion of said body.

* * * * *